Figure 3:
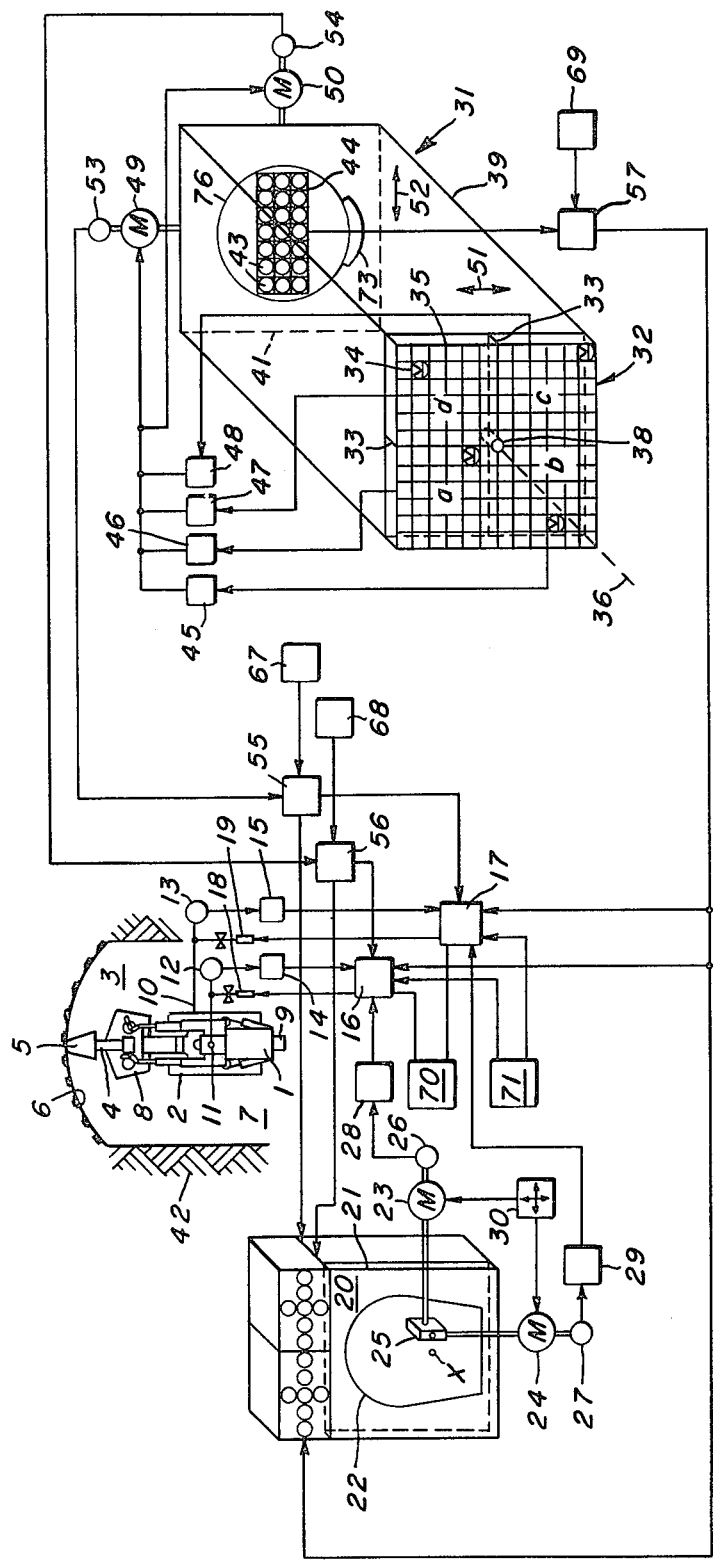

United States Patent [19]

Weber

[11] 4,027,210

[45] May 31, 1977

[54] METHOD AND CONTROL SYSTEM TO LIMIT SHIFTING MOVEMENT OF A WINNING TOOL FOR A TUNNELING MACHINE

[75] Inventor: Karl-Heinz Weber, Witten-Heven, Germany

[73] Assignee: Gebr. Eickhoff, Maschinenfabrik und Eisengiesserei m.b.H., Germany

[22] Filed: Apr. 2, 1975

[21] Appl. No.: 564,366

[30] Foreign Application Priority Data

Apr. 8, 1974 Germany .......................... 2416947

[52] U.S. Cl. ................................ 318/16; 318/578; 318/587; 299/1; 175/26; 356/152; 250/201; 203

[51] Int. Cl.² ........................................ G05B 17/02

[58] Field of Search ........... 299/1, 30; 318/16, 567, 318/578, 581, 587; 235/150.2, 150.27; 175/26; 356/141, 152, 172

[56] References Cited

UNITED STATES PATENTS

| | | |
|---|---|---|
| 3,321,248 | 5/1967 | Williamson et al. .................... 299/1 |
| 3,498,673 | 3/1970 | Ledray et al. .......................... 299/1 |
| 3,554,301 | 1/1971 | Adkins et al. ........................ 175/24 |
| 3,604,512 | 9/1971 | Carter et al. ........................ 172/4.5 |
| 3,619,618 | 11/1971 | Thorn Haar ........................ 250/203 |
| 3,706,284 | 12/1972 | Plasser et al. ........................ 104/7 B |
| 3,707,330 | 2/1971 | Pine .................................... 356/153 |
| 3,790,276 | 2/1974 | Cook et al. ...................... 250/203 R |
| 3,922,015 | 11/1975 | Poundstone .............................. 299/1 |

*Primary Examiner*—Gene Z. Rubinson

*Attorney, Agent, or Firm*—Brown, Murray, Flick & Peckham

[57] ABSTRACT

The winning tool carried for universal movement by the frame of a tunneling machine is controlled by a system and method to limit tool movement in a manner to form a tunnel with a desired cross section. Positioning of the winning tool is determined in relation to a laser beam projecting along the length of the tunnel while the range of universal movement by the winning tool is limited by a set of tool coordinate values determined by scanning a pattern, template or the like defining an outline that is geometrically similar to the desired cross section of the tunnel. The tunneling machine carries a receiver for the laser beam that irradiates front and rear detectors each including an array of photodetectors. Servomotors respond to an output signal from the front detector to align the receiver by a translating motion so that the laser beam passes through a single passageway in the front detector to irradiate the rear detector. The servomotors drive position transducers that provide output signals corresponding to the translating motion. These output signals are used to modify signals representing the set of tool coordinate values which are also modified by an output signal from the rear detector that corresponds to angular travel by the mining machine relative to the laser beam. An inclinometer or other means provides a signal used to prevent horizontal deviations transversely of the tunnel roadway during the tunneling operation.

30 Claims, 5 Drawing Figures

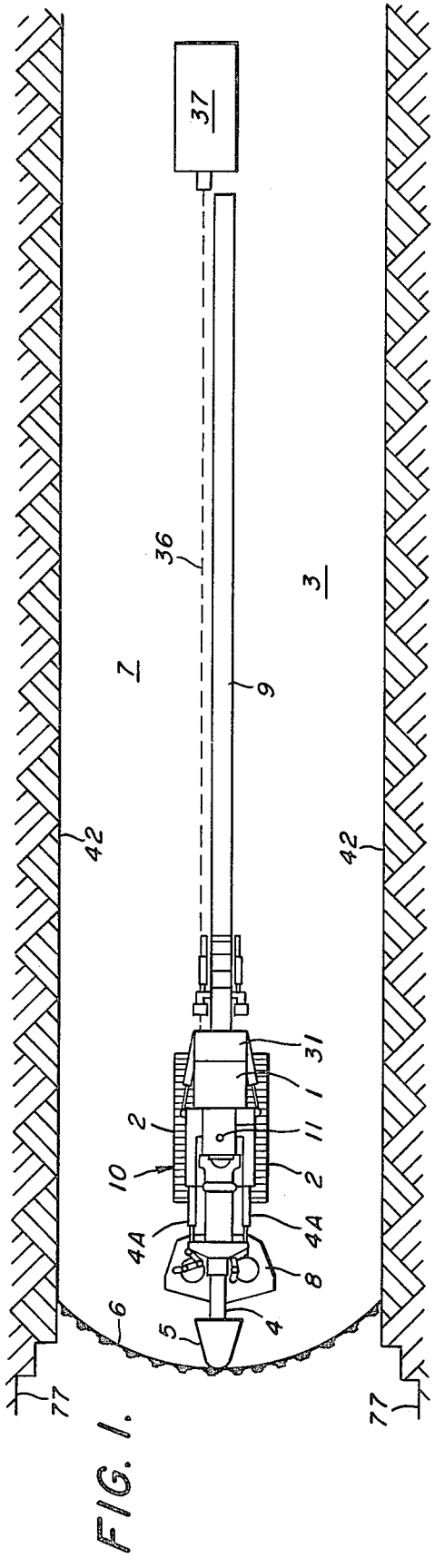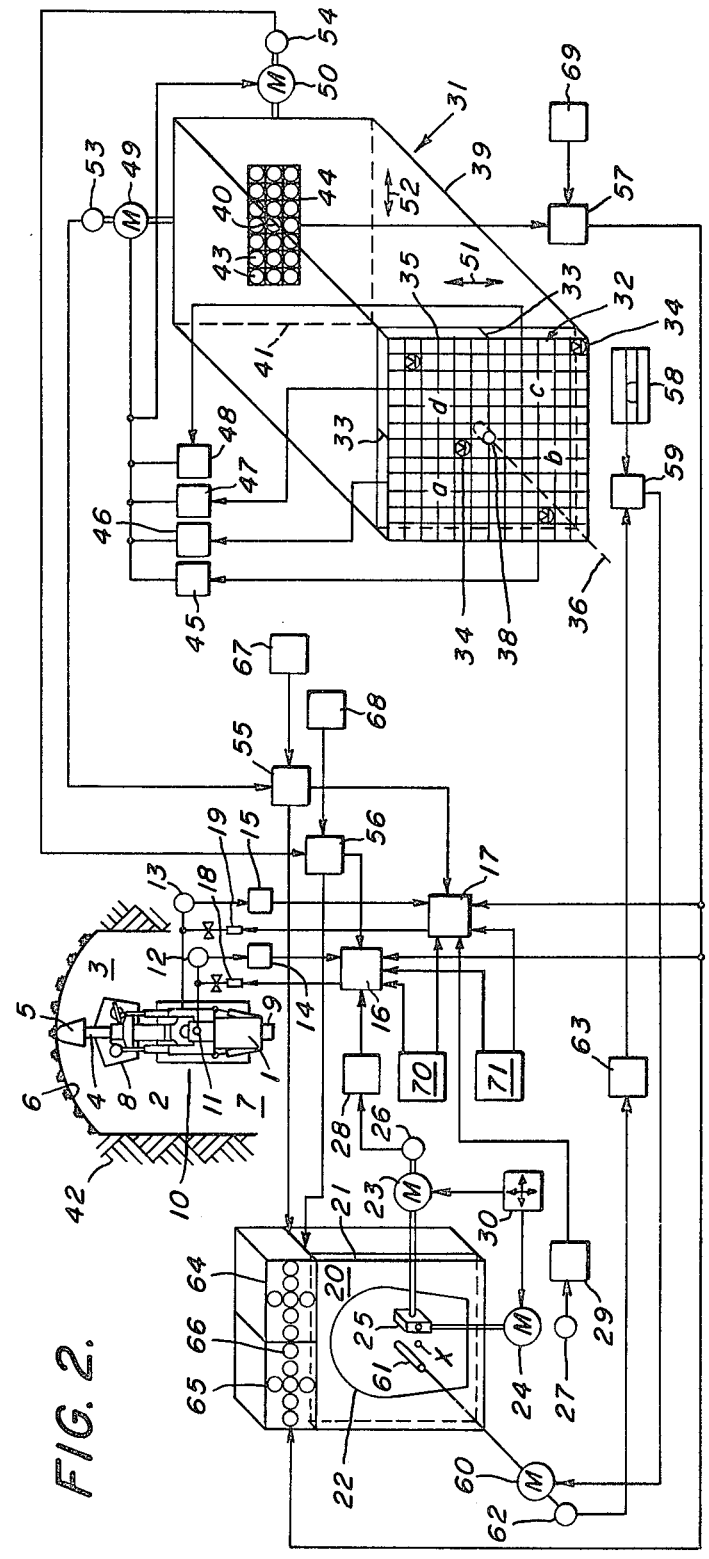
FIG. 1.
FIG. 2.

METHOD AND CONTROL SYSTEM TO LIMIT SHIFTING MOVEMENT OF A WINNING TOOL FOR A TUNNELING MACHINE

BACKGROUND OF THE INVENTION

This invention relates to a method of limiting shifting movement of a winning tool that is mounted on a universally-pivoted tool or support arm of a tunneling machine in a manner to form a tunnel with a desired tunnel cross section. More particularly, the present invention relates to a method and control system for determining the position of the winning tool in relation to a laser beam that projects along the length of the tunnel and for limiting the range of movement by the winning tool according to a set of tool coordinates formed by scanning a pattern, template or the like which defines a geometrically similar outline to the required tunnel cross section. The geometrically similar outline is scanned by a tracing probe, a light-reflective barrier or the like.

It is known in the art to provide a system to control and correct the movements of a tunneling machine or a winning machine which has a cutting tool that is mounted on a movable swing arm. The system includes a control screen located at a driver control station. The control screen has cross-hairs and scales which extend in the direction of the coordinates. The course of travel by the machine is indicated by the impingement of a guide beam on the screen. The control station for the machine also includes a device having a stationary guide frame and a picture frame which is movable relative to the guide frame in the two coordinate directions and includes scales and guides. The picture frame carries a transparent disc and an associated pattern, template or the like which define the required tunnel cross section by a small scale production. The disc and pattern are pivoted together relative to the picture frame and angularly adjustable by means of a device such as a click stop which has a scale calibrated in angles. The guides of the guide frame are employed to guide two crossed pointers which extend in the directions of the two coordinates. The guides are connected by means of known mechanical or hydraulic control elements to either the cutting tool itself or to the swing arm carrying the cutting tool. The same scale dimensions are used on the screen, the pattern and the picture frame. The purpose of these facilities is to enable the machine operator to detect the position and shape of the required tunnel profile. In the event of deviations to the correct movement of the machine and/or tool, such deviations are correct in a continuous manner without maneuvering the machine to and fro to bring about the correction.

Other forms of tunneling machines known in the art have a winning tool carried on a universally-pivotal arm that has a limited range of operation which corresponds to the required cross section of the tunnel. Tunneling machines of this type employ a pattern, template or the like that defines a shape which is similar to the required tunnel cross section. However, in these instances, the pattern or the like limits the range of operation by the tool so that it corresponds to the required tunnel outline. However, it is impossible for the machine operator to controllably move the tool beyond the tunnel outline. The tunnel outline on the pattern is detected by an abutment that is adjustable by the machine operator or by a light-reflective barrier which the operator guides along the outline of the pattern. The control elements that position the tool support arm are controlled by a servo control to insure that the tool movement remains in a corresponding agreement with the outline of the tunnel profile as defined by scanning the pattern with the light-reflective barrier or with the position of the abutment. The reference or set-value position of the pattern is determined by the beam from a laser transmitter. In the event of deviations, the pattern is moved by the machine operator. The light detector, when scanning by a light-reflective barrier, cannot produce output signals which would allow the tool to be positioned outside of the outline defined by the pattern. In a similar way, the abutment cannot depart from the outline of the pattern so that it is again impossible to provide output signals which would permit the positioning of the tool outside the outline defined by the pattern. Therefore, in this system, positioning of the winning tool is constrained strictly in accordance with the scanned outline of the pattern corresponding to the required tunnel outline and the tool cannot be moved beyond the limits of this outline which is unlike the first-known control system described previously.

Neither of the prior art systems can detect angular deviations of the machine about its longitudinal axis in relation to the laser beam and therefore such deviations cannot be detected by the machine operator. Moreover, it is impossible to compensate for inclinations of the machine about a horizontal axis that extends transversely of the tunnel length or rotational movement of the machine about a vertical axis. An adjustment to the pattern is ineffective to correct all such deviations. Geodetic aids are, therefore, required to maintain alignment of the machine in a longitudinal direction. In other words, geodetic aids are necessary to maintain the machine parallel with the laser beam while the machine moves along in a longitudinal direction of the tunnel.

SUMMARY OF THE INVENTION

It is an object of the present invention to provide an improved method of limiting shifting movement of a winning tool mounted on a universally-pivoted tool or cutter support arm of a tunneling machine in accordance with a required tunnel cross-sectional shape.

It is a further object of the present invention to provide a method of detecting not only parallel and rotational deviations but also angular deviations of a tunneling machine relative to a laser beam extending along the length of the tunnel while the range of shifting movement of the winning tool carried for universal movement on the tunneling machine is automatically limited to the desired tunnel cross section given by a set-value position determined in relation to the laser beam.

In the method of the present invention, a tracing probe or light-reflective barrier provides signals corresponding to a set of tool coordinate values which are corrected in the event of a deviation by the tunneling machine from its set-value position. A given position of the tunneling machine relative to the required cross section or relative to a laser beam projecting along the tunnel no longer adversely affects the range of operation by the winning tool. Deviation signals to the position of the tunneling machine provide a continuous correction to the set of tool coordinate values derived from the light-reflective barrier or the tracing probe while providing that the corrected range for operation by the winning tool remains within the range of angular movement ad determined by the maximum angles through which the support arm for the winning tool can pivot. The set of tool coordinate values may be corrected by producing signals corresponding to the deviations of the tunneling machine and/or by movements thereof which correspond to such deviations. The correcting signals are produced by a corresponding deviation of a receiver for the laser beam and/or by a geometrical outline on a pattern or the like. When deviations to the position of a tunneling machine occur, then equal and opposite movements of a receiver arranged to receive the laser beam and/or the pattern are used to automatically produce electrical correcting signals. The electrical correcting signals are used to modify the set of tool coordinate values produced by scanning the pattern so as to alter the range of movement by the winning tool in a manner such that it is always maintained in a proper position for registration with a tunnel having the desired cross section. The parallel deviations and angular deviations of the tunneling machine relative to the laser beam trigger correcting signals. These deviations have been relatively difficult to detect in the past. The more readily detectable deviations deal with rotation of the machine around its longitudinal axis because such rotation also produces a rotation of the pattern or of various parts of the receiver. According to another feature of the present invention, the receiver or parts thereof are aligned by the laser beam and by gravity but the pattern is aligned solely by gravity.

It is a feature of the present invention to provide that the laser beam is received by two consecutively-arranged receiver planes and that impingement of the beam upon the front plane trggers signals to produce a translating-type of movement of the entire receiver. The receiver is moved to locate the place of impingement by the laser beam at the center of the front plane. Angular deviations of the machine are detected by the impingement of the laser beam in the rear receiving plane. This feature enables detection of all forms of machine deviations, irrespective of whether they are parallel deviations and/or angular deviations from the laser beam and/or rotational deviations relative to the horizontal floor of the tunnel. Thus, the range of movement by the winning tool is continuously adjusted during operation in respect to an alternation to the position of the tunneling machine.

The method of the present invention is carried into practice by providing a control system to limit shifting movement of a winning tool mounted for universal movement upon a cutter support arm for adaptation to the required tunnel cross section. The position of the winning tool is determined by a laser beam projecting along the length of the tunnel while the range of tool movement is limited to a required tunnel cross section by a pattern, template or the like which is geometrically similar to the required tunnel cross section. The pattern is detected or sensed either by a tracing probe or a light-reflecting barrier which forms a set of tool coordinate values. According to the present invention, such a control system is characterized by providing a receiver that is vertically and horizontally adjustable while disposed on the frame of a tunneling machine in a manner to receive a laser beam projecting along the tunnel length. The receiver includes two consecutively-arranged surfaces which are parallel to one another and face toward the transmitter of the laser beam. The front surface of the receiver is subdivided into four, preferably square, sections each having photosensitive elements. In the region where the front receiver sections contact each other they bound a passageway corresponding to the diameter of the laser beam. Each section of the front receiver is connected via its own amplifier, with two servomotors that drive position transducers to produce electrical signals that are, in turn, fed to differential amplifiers receiving the signals corresponding to the set-values of the tool coordinates. When one or more photosensitive elements on the front receiver sections are irradiated by the laser beam, the output control signal is used to move the two receiver surfaces with a translating motion until the laser beam passes through the passageway in the front receiver surface for impingement onto the rear receiver surface which also includes photosensitive elements. The photosensitive elements on the rear receiver surface, when irradiated with the laser beam, supply an electrical signal which corresponds to the angular deviations of the tunneling machine relative to the laser beam, to the differential amplifiers.

Conveniently, the rate of adjustment of the tool support arm is steplessly variable and directly proportional to the rate of adjustment of the light-reflecting barrier or the tracing probe when scanning the pattern. In this way, it is possible to control not only the route of the winning tool but also the rate at which the tool support arm is adjusted. This also alleviates or at least reduces severe impact by the winning tool with the material at the tunnel face. In the past, impacting contact by the winning tool with the material caused an actual shifting of the tunneling machine from its reference or set-value position.

According to another feature of the present invention, the aforesaid two receiver surfaces include photosensitive elements. The rear receiver surface takes the form of printed circuit boards that are known in the art per se. The use of such circuit boards facilitates the connection of the various photosensitive elements to electronic facilities. The photosensitive elements for the front receiver are preferably disposed at closely-adjacent locations at the edges of each receiver section and near the central passageway for the laser beam while over the remaining area; the photosensitive elements are spaced apart at a greater distance. This feature simplifies the construction of the front receiver surface and reduces the number of photosensitive elements which are required.

The adjustably-mounted pattern or the like which defines a geometrical shape corresponding to the desired cross section of the tunnel is constructed in such a manner that it defines a stable center of gravity to maintain it horizontally. Alternatively, the pattern is positioned by adjustable means for restoring it to a stable horizontal position so that it remains unaffected by possible rotational deviations by the tunneling machine.

The photosensitive elements of the rear receiver surface are either disposed in rows and columns or they are preferably arranged to extend about the periphery of a rectangular surface having horizontal long sides. This facilitates a better and, particularly, a more accurate manner for detecting horizontal and rotational deviations to the position of the tunneling machine. These deviations are definitely more frequent and greater in magnitude than vertical deviations.

When the receiver, according to the present invention, includes a rear receiver surface having photosensitive elements disposed to form an outline of an area, then the laser beam incident on the rear receiver surface is shaped to form a cruciform in cross section. A laser beam having a cruciform shape is readily usable with the photosensitive elements on the rear receiver surface to detect not only horizontal and vertical deviations of the tunneling machine but also rotational deviations thereof around its longitudinal axis and to compensate for such deviations by means of producing correcting signals to modify the values to the set of coordinates for the winning tool. In this event, there is no need to rotatably mount the pattern, template or the like for the purpose of correcting the set of tool coodinate values.

According to another feature of the present invention, the transmitter or receiver for the laser beam includes a diaphragm having a cruciform aperture lying in the path of the laser beam. The laser beam with its cruciform cross section is incident on a lens disposed in the receiver behind the passageway formed in the front receiver surface. The lens magnifies the laser beam, thus increasing its cross section to dimensions corresponding to the dimensions of that portion of the rear receiver surface around which the photosensitive elements are arranged.

Deviations of the tunneling machine around its longitudinal axis can be detected by means of a laser beam with a cruciform in cross section only if either the beam itself or the rear receiver surface or the portion of the rear receiver surface containing the photosensitive elements or the diaphragm associated with the receiver remains unaffected by such rotational deviation. According to the invention, in a control system in which a beam-shaping diaphragm is associated with the receiver, the rear receiver surface or only a part of the rear receiver surface containing the photosensitive elements or the diaphragm is rotatably mounted and provided with means to define a stable center of gravity.

According to another feature of the present invention, a matrix arrangement of photosensitive elements on the rear receiver surface compensates for a lens error. This error arises when the laser beam is incident upon the lens which is inclined because the machine has deviated from its set-value position. In these instances, there is some refraction of the laser beam.

The photosensitive elements at the rear receiver surface are connected to a counter which compensates for an arc error of the tool support arm and for a displacement error by the front receiver surface. The arc error for which the counter compensates arises because the winning tool moves on a surface which defines a shape that approximately resembles a spherical cup; whereas the light-reflecting barrier or the like scans about the flat plane of the pattern or the like. Consequently, the differences compensated for by the counter output signal exist particularly in regard to the edges of the pattern between the tool coordinates and the coordinates produced by the light-reflecting barrier. The counter also compensates for errors arising when the tunneling machine deviates within a plane parallel to the laser beam while the longitudinal axis of the machine is simultaneously inclined relative to the laser beam. As the position of the tunneling machine changes, so does the position of the receiver since the receiver is subject to all the movements of the tunneling machine. Consequently, when the receiver is movably adjusted to bring the passageway in the front receiver surface back into a receiving position for the laser beam, the receiver is moved in a plane which is inclined to the required tunnel cross section by an amount corresponding to the arc measure of the angular deviation. As a result, when the longitudinal axis of the tunneling machine is not parallel with the laser beam, the adjusting distance and, therefore, the receiver output signal, which is proportional to such distance, is always greater than the smallest distance when measured perpendicularly to the beam between the passageway in the front receiver surface and the beam. Thus, this measured distance is correspondingly greater than the actual parallel deviation of the machine. The counter compensates for this error which depends upon the arc measure of the angular deviation.

Arc errors occur to the position of the support arm irrespective of the deviation of the tunneling machine from its reference position. The error is at a maximum at the face edge regions of the tunnel when the support arm is in its furthest horizontally or vertically-extended position. Consequently, the two counters supplied by signals from pulse transmitters associated with the receiver must be able to compensate for support arm arc errors even in the absence of a correcting signal from the rear surface of the receiver. Also, the pattern includes contours which compensate for the arc errors and, therefore, compensation is provided even when the machine has assumed a reference position and neither the front nor the rear receiver surface indicates deviations from the received laser beam.

The tunneling machine can be employed to form a tunnel having horizontal or vertical bends when provisions are made for horizontal and vertical adjustments to a coordinate system whose origin passes through the center of the photosensitive elements on the rear receiver surface. The machine operator can, therefore, shift or change the range of tool operation as delimited on a tunnel face surface so that it is geometrically similar to but larger than the pattern in vertical and horizontal directions. The smallest shift which can be made to the range of tool operation depends upon the module of the photosensitive elements or upon an integral multiple of such a module, that is, of the matrix. The tunneling machine can, therefore, produce a stepped bent section to the tunnel if after each material-removing step determined by the depth of cut of the machine, the coordinate system is advanced by one step, i.e., depending upon the required bend, either by one module or by an integral multiple thereof. The bent tunnel section is, therefore, produced by a series of discrete steps which are offset from one another horizontally and/or vertically.

Instead of adjusting the coordinate system as just described, the present invention further provides that the rear receiver surface, or that portion thereof which has the matrix of photosensitive elements, can be adjusted to achieve the same effect. Moreover, instead of adjusting the coordinate system for the rear receiver surface or matrix area, the pattern or even the complete indicating facility can be adapted for movement in its plane so that the tunnel section which is bent relative to the previous section can be formed in horizontal and/or vertical steps by means of a corresponding displacement of the pattern or the indicating facility. The depth of the steps must, in all cases, remain constant if the direction of the tunneling is to be maintained accurate in the longitudinal axis of the bent part. Accordingly, the present invention includes means for measuring the distance traveled by the tunneling machine.

The control system, according to the present invention, has a projection surface to indicate parallel deviations and a projection surface to indicate angular deviations by the tunneling machine. One such surface is connected to the final control element of the receiver and the other surface is connected to the photosensitive matrix on the rear receiver surface. A signal appears continuously on these projection surfaces both while the machine is in operation, that is, during winning operations and during advancing movement by the machine. The projection surfaces consist of a horizontal row and a vertical row of light-emitting diodes crossing one another. By energizing the light-emitting diodes, the operator is informed as to the exact position of the machine and its angular deviation from the laser beam, thus enabling him to move the machine very accurately into a set-value position.

Figure 4:
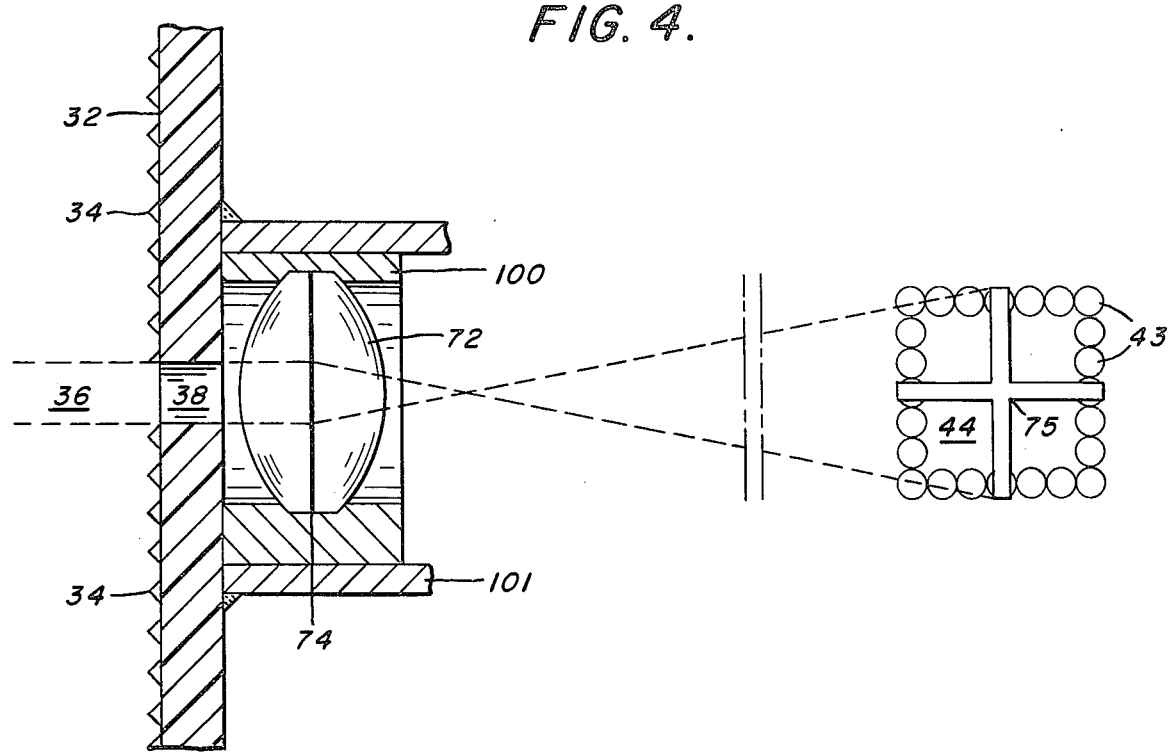
Figure 5:
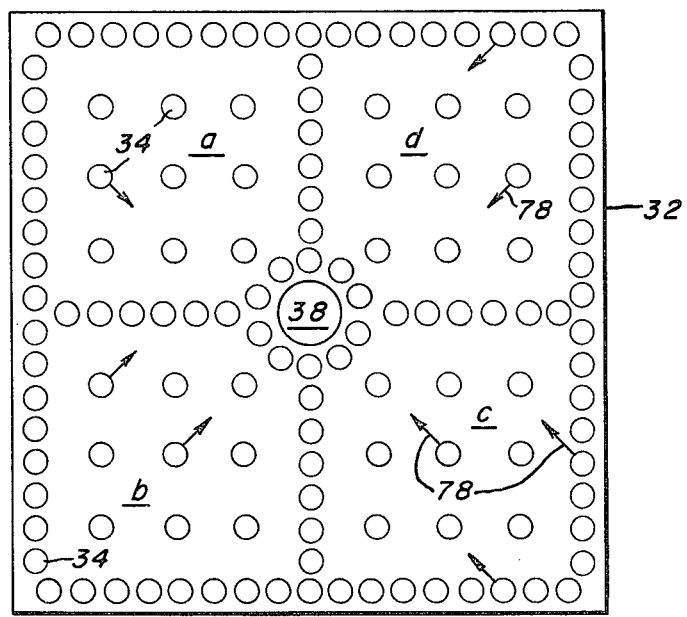

These features and advantages of the present invention as well as others will be more readily understood when the following description is read in light of the accompanying drawings, in which:

FIG. 1 is a plan view of a tunneling machine and illustrating a tunneling operation according to the present invention;

FIG. 2 includes a schematic diagram of the control system according to the present invention and a diagrammatic view showing the construction of certain component parts thereof;

FIG. 3 is a view similar to FIG. 2 and illustrating a second embodiment of a control system according to the present invention; and FIGS. 4 and 5 illustrate diagrammatically details of component parts of a receiver for a laser beam according to the present invention.

FIGS. 1–3 illustrate a tunneling machine 1 having endless link belts forming caterpillers 2 that propel the machine along a floor 3 of a tunnel. A drum cutter 5 is mounted on a universally-pivoted arm 4 supported by the tunneling machine. The drum cutter works on a face 6 of a tunnel or roadway 7. A loader 8 receives the resulting debris and transfers it to a conveyor 9 which extends along the length of the roadway. Arm 4 has a horizontal pivot axis 10 and a vertical pivot axis 11. Double-acting piston and cylinder assemblies 4A as well as other piston and cylinder assemblies, not shown, move the arm 4 to adjust and guide the drum cutter 5 over the entire face 6 of the tunnel to be opened up. The pivot shafts or other members at the pivot points 10 and 11 are connected to motion transducers such as pulse transmitters 12 and 13, respectively, whereby all pivotal movements of the drum cutter are detected by an associated transmitter. The transmitters each produce a number of electrical output pulses that vary in a directly proportional manner to the angular displacement of the pivot arm 4. In the control system, according to FIGS. 2 and 3, counters 14 and 15 convert the pulse output signals from transmitters 12 and 13 into analog signals which are delivered as input signals to differential amplifiers 16 and 17 and form the actual value of a set of drum cutter coordinates which are compared in the differential amplifiers 16 and 17 with a set of desired input signals. Any deviations between the signals with set values and the signals corresponding to the measured values are delivered as error signals from the differential amplifiers 16 and 17 to actuate electrohydraulic controls 18 and 19, e.g., servo valves, to correct the position of the drum cutter 5 by restoring it to its set-value or reference position.

The tunneling machine has a control station for the machine operator. At this station, the frame of the tunneling machine supports an indicating device 20 having a face surface 21 containing a geometrical shape that defines, at a reduced scale, the outline of the required tunnel cross section. The markings on the face surface 21 form a pattern, drawing or the like that defines a shape that is geometrically similar to the desired cross section of the tunnel. A template defining by its edge surface such a geometrical shape can be used. A light-reflecting barrier 25 or a tracing probe is movably displaced by two motors 23 and 24 about the entire surface 21 to scan the outline of the pattern. Pulse transmitters 26 and 27 provide a pulse output signal which corresponds to a measure of the distance of adjustment by the motors 23 and 24, respectively. Other forms of transducers for rotary motion can be used. The pulse outputs from transmitters 26 and 27 are fed to counters 28 and 29, respectively, which produce analog signals corresponding to a set of coordinates to the position of barrier 25. The set of coordinate signals from counters 28 and 29 are analog signals corresponding to the coordinates of set values for the drum cutter which are delivered to the differential amplifiers 16 and 17.

Thus, in operation, the machine operator guides the light-reflecting barrier 25 over the surface of the pattern and the drum cutter 5 must always follow the movement of the light-reflecting barrier. The drum cutter, therefore, can only be displaced to form a tunnel with a cross section which is similar to the pattern outline but greater in size. The movement by the drum cutter cannot depart from the region of the tunnel face 6 because once the barrier 25 moves beyond the geometrical shape, there is a cessation of any output signal which, therefore, prevents any further pivoting movement of the support arm 4 beyond the edge of the tunnel face 6. A manual control 30, such as a joy stick control, is used by an operator to control the motors 23 and 24 and thereby produces vertical and horizontal displacements of the barrier 25 within a coordinate system. The control of motors 23 and 24 determines not only the direction of movement by the light-reflecting barrier 25 but also the rate of adjustment thereof. The direction of movement and rate of adjustment of the drum cutter are controlled in this way through the agency of a synchrocontrol coupled with the piston and cylinder assemblies for displacing the arm 4. The speed of movement by the arm is adapted to the speed of movement by the barrier 25 which the operator controls by means of the rate of adjustment of the barrier. This is accomplished by means of, for example, using a stepless and variable speed type motor for the motors 23 and 24. By adapting the speed of movement of the arm 4 to the speed of movement by the barrier 25, the operator can control the gradual engagement of the drum cutter with the material on the tunnel face 6.

The indicating device 20 merely limits the range of cutting action by the drum cutter 5 to the tunnel cross section determined by the pattern 22; however the indicating device 20 cannot detect a turning deviation of the mining machine relative to the length of the tunnel and movements of the mining machine transversely to the length of the tunnel. Moreover, the indicating device cannot correct the range of cutting action by the drum cutter 5 in a manner to compensate for positional deviations by the tunneling machine.

The term "parallel deviations" as used herein is defined to mean lateral movements of the tunneling machine which are parallel to a laser beam 36 produced by a transmitter 37 to extend along the length of the tunnel. The term "angular deviations" as used herein is defined to mean inclinations of the longitudinal axis of the tunneling machine relative to the laser beam. The term "rotational deviations" as used herein is defined to mean a rotation of the tunneling machine about its longitudinal axis. Parallel, angular and rotational deviations may all occur during the operation of the tunneling machine either individually or together.

According to the present invention, angular deviations are detected by a further control system that includes a receiver 31 having a front detector 32 which is subdivided into four equal square sections A, B, C and D. The adjacent and contiguous surfaces of the squares take the form of printed circuit boards with a substrate that is either conductive or nonconductive. An intermediate layer 33 forms a light barrier between the circuit boards. Each square section of the front detector 32 includes photodiodes 34 disposed in rows and columns whereby the photodiodes on each section lie within horizontal rows and vertical columns. Photocells, phototransistors and similar forms of light detectors may be employed in place of the photodiodes 34 with equal success. A disc 35 overlies the photodiodes to scatter the incident light from the laser transmitter. The photodiodes can be disposed at fairly-spaced locations from one another on each of the square sections A–D since the light beam is scattered by the disc and is incident on the boards with a relatively large diameter.

The light beam is actually the laser beam 36 produced by the laser transmitter 37. The laser transmitter is set up on the roadway which forms part of the tunnel that has already been formed. The laser is aligned in accordance with the direction in which the tunnel is to be formed as best shown in FIG. 1. The laser beam 36 is sharply bunched so that it is about 16 millimeters in diameter and forms a fixed datum line parallel to the length of the tunnel. The laser beam is incident on the geometrical center of the front detector 32 when the tunneling machine is located in a reference or set-value position. The beam passes through a passageway 38 in the front detector to the inside of a casing 39 of the receiver where it is incident on the center 40 of the rear detector 41 forming part of the rear casing wall. The incidence of the beam in this manner occurs when the mining machine is in its set-value position whereby it is free from angular and parallel deviations relative to the laser beam and the tunneling machine is, therefore, at the correct elevation and at the correct lateral spacing from the peripheral sides 42 of the roadway. Passageway 38 defines a diameter that corresponds to the diameter of the laser beam. The rear detector 41 of the receiver has photodiodes 43 disposed in a rectangular surface portion 44 whose longest sides extend horizontally. The rectangular surface 44 surrounds the center 40 and takes the form of a printed circuit board. Phototransistors, photocells and similar light detectors may be used with equal success instead of the photodiodes 43.

The photodiodes 34 on square A–D forming the front detector 32 are connected to amplifiers 45–48, respectively. The outputs from these amplifiers control motors 49 and 50. Motor 49 provides vertical adjustment of the receiver casing 39 which is indicated in FIGS. 2 and 3 by the double arrow 51. Motor 50 provides horizontal adjustment of the casing 39 in the direction indicated by the double arrow 52. Pulse transmitters 53, 54 are driven by motors 49 and 50, respectively. Counters 55, 56 receive the respective pulse outputs from transmitters 53 and 54 and provide electrical signals that represent a measure of the rotation by the two motors 49 and 50. The outputs from counters 55, 56 are analog correcting signals supplied to the two differential amplifiers 16 and 17 that alter or modify the set-value signals supplied by counters 28 and 29.

The output signals from photodiodes 43 at the rear wall of the detector are delivered to a counter 57 having its analog output signal fed to the two differential amplifiers 16 and 17 whereby when the photodiodes are irradiated by the laser beam they deliver a correcting signal to the differential amplifiers 16 and 17 representing a deviation by the laser beam from the center 40 of the surface portion 44. This correcting signal corresponds to angular deviations of the longitudinal axis of the tunneling machine with respect to the laser beam 36.

The plane of movement by the drum cutter 5 as it contacts the material in front of it resembles approximately a spherical cup. However, the pattern 22 is flat or a two-dimensional representation of the tunnel or heading cross section at a reduced scale. Consequently, near the contours of the tunnel where the tool support arm 4 is at its maximum deflection and also possibly up or down vertical deflections, the set values provided by the cooperation between the pattern 22 and the barrier 25 are bound to differ from the actual position of the drum cutter. To compensate for the resulting arc error which is particularly noticeable near the edge contours of the tunnel or heading, the geometrical outline of the pattern 22 is shaped in a manner to obviate this arc error. An arc error arises when the tunneling machine has deviated from its reference position and this error is compensated for according to the present invention. Counters 55 and 56 are used for this purpose since they deliver correcting signals to the differential amplifiers 16 and 17 in the event of adjusting movements to the receiver 31. The correcting signal at the output of counter 57 corresponds to the angular deviation of the tunneling machine 1. In the event of deviations by the tunneling machine, all three counters 55, 56 and 57 operate individually or together to superimpose upon the set values produced by scanning the barrier, a correcting signal to compensate for an arc error change. In other words, the three counters 55, 56 and 57 adapt the arc error correction already provided by means of the pattern 22 to the actual deviation by the tunneling machine.

The output signal from counter 57 also allows for the error arising out of the movement of the two motors 49 and 50 when the movement of the receiver surface is at an inclination to the laser beam 36. This situation occurs whenever the longitudinal axis of the mining machine is inclined to the laser beam 36. Since the receiver 31 is supported by the machine frame, the receiver undergoes all the movements of the mining machine. When the receiver 31 is inclined to the laser beam 36 and as a result when the motors 49 and 50 move the receiver to align the passageway 38 with the laser beam, the front receiver 32 moves in a non-perpendicular fashion to the laser beam and, therefore, receiver surface 32 is inclined by an amount corresponding to the deviation angle with the attendant result that the distance of adjustment is actually greater than the shortest perpendicular distance between the laser beam 36 and passageway 38.

When the laser beam is incident on one of the four square sections A–D, the position of the tunneling machine relative to the laser beam has changed as it moves toward the tunnel face 6 because the machine has advanced toward one or the other of the face peripheries 12 and ceases to be parallel with the beam 36. When these situations occur, a photodiode 34 is irradiated and delivers an output signal to the respective one of amplifiers 45–48. This energizes the two motors 49 and 50 so that they, in turn, move the casing 39 into a position whereby the laser beam 36 is once again incident on the passageway 38 in the front detector 32. When this occurs, the laser beam is incident on surface 44 of the rear detector inside the casing which contains a matrix arrangement of photodiodes 43. The passageway 38 has now been aligned with the laser beam 36 but if angular deviations to the tunneling machine were responsible for the initial movement of the casing 39, then the longitudinal edges of the casing are not parallel with the laser beam. After the correcting movement by the motors 49 and 50, the casing 39 can be in a position in which the laser beam 36 is incident on the center 40 of surface 44 only if the tunneling machine is parallel with the laser beam. If the tunneling machine is not parallel to the laser beam, then depending upon the inclined position, one of the photodiodes 43 which is outside, that is, laterally of or above or below the center 40, is irradiated to trigger a correcting signal corresponding to the angular deviation. In this situation, the set-value signal supplied to the two differential amplifiers 16 and 17 is corrected either by the output signals of counters 55 and 56, such signals being proportional to the adjustment distance of casing 39 when the deviations of the machine are purely parallel deviations, or by the output signals of counters 55 and 56 and the output signal of counter 57 to correct the set-value signal supplied to the differential amplifiers 16 and 17 when there occurs, in addition to parallel deviations, angular deviations by the tunneling machine between its longitudinal axis and the laser beam. As previously described, the latter correction is alway associated with an arc error correction. The range of movement of the drum cutter 5 is, therefore, on one hand so reduced by the correcting signals and, on the other hand, so increased in a manner such that the tunnel outline formed by the drum cutter remains in a fixed position relative to the laser beam 36.

According to the embodiment illustrated in FIG. 2, an inclinometer 58 provides an electrical signal to continually correct the range of operation of the cutter drum 5 so that as the floor of the tunnel is formed, it will extend in a horizontal relation to the tunnel or heading length of the tunnel. In the event of rotational deviations by the tunneling machine, the signal produced by the inclinometer 58 is fed to amplifier 59 and then employed to actuate a motor 60 to pivot the indicating device 20 or pattern 22 about axis 61 into a horizontal position. Pulse transmitter 62 and counter 63 produce an output signal which corresponds to the angular displacement of the indicating device 20 or pattern 22 by the motor 60. This signal is used to balance the amplifier 59. In this way, the bottom edge of the geometrical outline defined by pattern 22 is maintained horizontally and thereby the pivoting range of arm 4 is limited so that the bottom edge of the tunnel face is maintained horizontal during operation by the drum cutter 5.

The output signals from counters 55, 56 and 57 are also used to form a visual display by display surfaces 64 and 65, each having an intersecting row and column of illuminating diodes 66 arranged to form a cross. Thus, deviations to the position of the tunneling machine from its set-value position are visually displayed to the operator by the illumination of a particular one or more diodes 66 by the output signals from counters 55, 56 and 57. The set-value position of the tunneling machine is determined by the point of intersection of the two rows of diodes 66. When the tunneling machine is advanced, the operator can maneuver the tunneling machine in the direction towards its reference position wherein the range of pivoting movement by arm 4 is substantially at the center of the required tunnel outline since the directional control is in operation during this movement of the machine and it indicates the actual machine position.

The counters 55, 56 and 57 are connected to threshold adjusters 67, 68 and 69, respectively. The threshold adjusters 67 and 68 each has two threshold settings to limit movements of the casing 39 in only one direction, that is, vertically or horizontally. A threshold adjuster 69 is connected to counter 57 and it has four threshold settings. The range of operation by arm 4 can be arbitrarily reduced if necessary by adjusting the settings of threshold adjuster 69 since these settings prevent movement of the arm beyond the set threshold values.

An adjuster 70 is provided so that the indicating facility can be adjusted relative to the laser beam 36 before the actual tunneling operation starts. In this respect, arm 4 is moved into its horizontal position by manual control of the electrohydraulic device 19. The arm 4 is also moved by manual adjustment to the electrohydraulic control 18 for alignment along the longitudinal axis of the tunneling machine. The indicating device 20, receiver 31 and inclinometer 58 are turned OFF or otherwise rendered inoperative. Under these conditions, the receiver 31 must be arranged so that its longitudinal axis is in a dead-parallel relation with the longitudinal axis of the tunneling machine. The vertical position of the receiver is defined to be a neutral position and the two pulse transmitters 53 and 54 must be set to indicate there there is no deviation by the receiver from the reference position. The receiver must also indicate that it is in its dead-center of its range of adjustment. The receiver is moved into this aligned position by means of zeroing controls associated with the threshold adjuster 69. Once the receiver 31 has been set up in this manner, the tunneling machine is moved into a position in which the laser beam 36, which has been aligned by geodetic means, is incident on one of the square sections A–D of the first detector. The barrier 25 is now controlled to form coordinates which are exactly proportional to the coordinates of the drum cutter by moving the barrier into registration with point X of the pattern surface. This is accomplished by controlling motors 23 and 24 after which the zeroing adjuster 70 is operated. Since the tunneling machine is rarely free from rotational deviations, when the control is switched ON, the inclinometer 58 produces an output signal which causes adjustments to the pattern 22 in a manner such that it moves into a dead-horizontal position by operation of motor 60. Motor 60 rotates the indicating device 20 about axis 61 to align the bottom edge of the pattern 22 into a horizontal position. The casing 39 is moved into a position whereby the laser beam 36 projects through the passageway 38 into the interior of the casing. The beam is incident on one of the photodiodes 43 on surface portion 44 in a dependent relation to the amount of instantaneous angular deviation by the tunneling machine. Correcting signals are then produced by the correcting movement of the indicating device 20, the distance of adjustment to the receiver 31 and the irradiation of the photodiodes 43 by the laser beam. These correcting signals modify the tool coordinate reference values determined by the position of barrier 25. The latter signals, on one hand, restrict the range of operation of arm 4 and, on the other hand, increase the range of such operation so that the corrected range of operation coincides exactly with the required tunnel cross section. A limiter 71 defines a set value that presents an excessive increase to the set value by the correcting signals.

In the embodiment according to FIG. 3, a rotational deviation by the tunneling machine is detected by means of the laser beam 36 and a correcting signal is produced to compensate for such deviations. In this regard, and as shown in FIG. 4, the casing 39 of the receiver 31 has directly behind the passageway 38 in the front detector 32, a lens 72 with a diaphragm 74 having a cruciform aperture therein. As the laser beam 36 enters the passageway 38, it is shaped by the cruciform aperture in diaphragm 74. Lens 72 produces a magnification of the beam and thereby scatters the light of the beam in the form of a cross 75 at the point where the light impinges upon surface portion 44 at the rear detector 41 over the height and width thereof. The cross 75 has a vertical arm and a horizontal arm. In the absence of positional and angular deviations of the tunneling machine relative to the laser beam 36, the arms of the cross coincide exactly with the two planes of symmetry of surface portion 44 which are at right angles to one another.

According to the embodiment of FIG. 3, the photodiodes 43 are arranged only about the peripheral edge of surface portion 44 which is unlike the embodiment of FIG. 2 wherein the photodiodes 43 are arranged in rows and columns. In both embodiments, the spacing between the photodiodes 43 in such so as to compensate for the optical error of the lens. This error occurs because the angle of incidence of the laser beam 36 varies with the position of the tunneling machine. The correcting signals which are formed by the impingement on the laser beam 36 on the surface portion 44 in the event of angular deviations by the machine, always adapt the set values of the tool coordinates determined by the position of the barrier 25 to the instantaneous position of the tunneling machine and keep the drum cutter 5 within its reference position.

Referring again to FIG. 4, the vertical arm of the cross detects horizontal angular deviations of the tunneling machine since the laser beam 36 impinges upon the surface portion 44 in the form of a cross 75 and each end of its two arms irradiates one of the photodiodes 43 extending about the periphery of surface portion 44. In a similar way, the horizontal arm of the cross is used to detect angular deviations of the tunneling machine and the two arms of the cross are used together to detect rotary deviations of the machine, that is, deviations about the longitudinal axis of the machine. In this embodiment of the present invention, there is no need to correct for position errors of the pattern since there is provided a circular and rotatably-mounted disc 76 which carries surface portion 44. A weight 73 attached to the disc 76 maintains surface portion 44 horizontal under the influence of gravity. A substitute for weight 73 is provided by a sleeve 100 with an enlarged bottom section that forms a weight. The lens 72 is supported by sleeve 100 which is rotatably carried by an outer sleeve 101 in a manner such that sleeve 100 rotates to maintain the cruciform aperture in a constant horizontal location under the influence of gravity. Therefore, according to the embodiment of FIG. 3, there is no need to employ an inclinometer or the various controls and regulating elements associated therewith.

FIG. 5 illustrates an aspect of the present invention dealing with the placement of photodiodes 34 and the use of a very reduced number of such diodes on the front detector 32 so that the casing 39 can be adjustably moved to align passageway 38 with the laser beam 36. As clearly shown in FIG. 5, only the edges of the squares A–D and the zones on each which are directly adjacent the passageway 38 have a large number of photodiodes 34. The interiors of each square A–D, on the other hand, have only a reduced number of photodiodes which are spaced relatively far apart from one another but in a manner by which one of the photodiodes will always be irradiated by the laser beam when scattered by disc 35. When an irradiated photodiode is located on one of the two perpendicular planes of symmetry of the front detector 34, it triggers an output signal that produces adjusting movement by the two motors 49 and 50 which are operated at the same rate of adjustment to move passageway 38 into the path of the laser beam. Motor 49 moves the casing 39 vertically until the laser beam is incident upon a row of diodes in the horizontal plane of symmetry and motor 50 moves the casing horizontally until the laser beam is incident on a vertical row of diodes. The resulting movement of the casing 39 is, therefore, always in the direction of arrows 78 which is dependent upon the particular square A–D which the beam impinges upon. If the beam is not aligned with passageway 38 as the casing 39 is moved along its path, the resulting movement of the casing is merged into a purely horizontal movement when the laser beam 36 is incident on the first of the photodiodes 34 in a horizontal plane of symmetry of the detector. The movement of the casing is merged into vertical movement when the laser beam is incident on the first of the photodiodes in the vertical plane of symmetry of detector 32. In both instances, the casing 39 is moed with an entirely translating motion until the laser beam 36 is incident on passageway 38. The movement of the casing is retarded or slowed down as the laser beam impinges upon the ring of photodiodes surrounding the passageway 38.

The control system according to the present invention enables the use of a tunneling machine to drive sections of tunnels or headings or the like at an angle to the tunnel which has already been formed. For this purpose, the coordinates, which extend through the center of surface portion 44 of the rear detector, are adjusted horizontally and vertically. When the machine operator moves the coordinate system horizontally relative to the rear receiver surface 44 or the associated surface portion with its photodiodes 43 by an amount corresponding to the spacing between two consecutive diodes, the range of operation of the drum center is correspondingly changed and, therefore, the position of the tunnel cross section is changed. The resulting material-removing step which is determined by the depth of cut by the machine is, therefore, laterally offset from the existing roadway by an amount corresponding to the spacing between the two consecutive diodes. If this shift to the coordinates is repeated in the same amount, then the next material-removing operation is again offset from the immediately previous material-removing operation by the same amount and as a result, the stepped tunnel or heading portion 77 shown in FIG. 1 is produced. The step depth can be controlled by the depth of the cut of the machine 1. Alternatively, the caterpillers 2 or associated drive for the tunneling machine include means for measuring the distance traveled by the machine so that the depth of the material removed during the cutting operation can be limited to a desired value.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A method for limiting shifting movement of a winning tool carried for universal movement on a tunneling machine employed to form a tunnel having a desired cross section, said method including the steps of determining the position of said winning tool relative to the tunneling machine by generating tool position coordinate signals in relation to a laser beam projecting along the tunnel toward the tunneling machine, forming a set of tool coordinate values from a pattern, template or the like which defines a shape that is geometrically similar to the desired cross section of the tunnel, said set of tool coordinate values defining limits to the universal movement by said winning tool for movement thereof within the desired tunnel cross section, generating signals to correct the coordinate values of said set of tool coordinate values in response to a position deviation by said tunneling machine from its position when said tool position coordinate signals were formed.

2. The method according to claim 1 wherein said signals generated to correct the coordinate values correspond to deviations of movement detected by a receiver for said laser beam on said tunneling machine.

3. The method according to claim 1 wherein said signals generated to correct the coordinate values correspond to deviations of movement by the tunneling machine detected from said pattern.

4. The method according to claim 2 including the further steps of moving said receiver while receiving said laser beam in an opposite direction to and by an amount equal to the deviation of movement by said tunneling machine from its position when said tool position coordinate signals were formed, and producing an electrical signal corresponding to the movement of said receiver to correct the deviation of movement by said tunneling machine.

5. The method according to claim 3 including the further steps of moving said pattern in an opposite direction to and by an amount proportional to the deviation of movement by said tunneling machine from its position when said tool position coordinate signals were formed, an producing an electrical signal corresponding to the movement of said pattern to correct the deviation of movement by said tunneling machine.

6. The method according to claim 4 wherein said receiver is moved while receiving the laser beam to detect parallel and angular deviations of movement by said tunneling machine relative to said laser beam, and wherein the method includes the further steps of moving said pattern in an opposite direction to and by an amount proportional to the rotational deviation of said tunneling machine about the longitudinal axis thereof, and producing an electrical signal corresponding to the movement of said pattern to correct the rotational deviation of said tunneling machine about the longitudinal axis thereof.

7. The method according to claim 6 including the further steps of aligning said receiver in relation to said laser beam and in relation to gravity to receive said laser beam prior to said step of generating signals, and aligning said template in relation to only gravity prior to said step of generating signals.

8. The method according to claim 4 wherein said receiver includes two consecutively-arranged receiver planes to detect said laser beam, said step of moving said receiver includes shifting said receiver by translating movement in response to signals generated by impingement of the laser beam upon the front plane into alignment with an aperture in the front plane with the laser beam and to project the laser beam onto the rear plane, and using said signals generated by impingement of the laser beam upon the front plane to detect angular deviations of the tunneling machine relative to the laser beam for said step of producing an electrical signal.

9. A control system to limit movement of a winning tool including a support arm adapted for universal movement while supported by the frame of a tunneling machine employed to form a tunnel with a desired cross section, the position of the winning tool being determined in relation to a laser beam projecting from a laser transmitter along the length of the tunnel while the range of universal movement by the winning tool is limited by a set of tool coordinate values formed by the output of a device to scan a member such as a pattern, a template or the like which defines a geometrical outline that corresponds to the desired tunnel cross section, said control system including:

a receiver having two consecutively-arranged and parallel receiver surfaces facing toward said laser transmitter to detect the laser beam, said receiver being supported by the frame of said tunneling machine in a manner such that one of said receiver surfaces defines a front receiver that includes an array of detectors bounding a common passageway corresponding essentially to the diameter of the laser beam, the other receiver surface including a detector defining a rear receiver, separate amplifier means for the output signal from each detector of said array of detectors, servomotor means responsive to an input signal from each amplifier means for said array of detectors to move both of said front and rear receivers by translating motion to align the common passageway in the front receiver with the laser beam and thereby irradiate the rear receiver with the laser beam.

transmitter means coupled to said servomotor means, and means receiving the output signals from said transmitter means and the output signals from said means to scan for producing electrical deviation signals corresponding to angular deviations of said tunneling machine relative to said laser beam, the last said means further receiving the output signal from said rear receiver when irradiated by the laser beam.

10. The control system according to claim 9 wherein said means to scan includes an adjustable light-reflective barrier to scan said member defining a geometrical outline that corresponds to the desired tunnel cross section, said control system further including control means to adjust the displacement of said winning tool at a steplessly variable rate and in a directly proportional manner to the rate of adjustable movement of the light-reflective barrier.

11. The control system according to claim 9 wherein said front receiver and said rear receiver are each further defined to include a printed circuit board having photosensitive detector elements thereon.

12. The control system according to claim 9 wherein said array of detectors forms a matrix of two columns and two rows, whereby said common passageway lies at the center of the matrix, each detector forming the matrix including a plurality of photosensitive elements arranged in a spacedapart manner such that the elements adjacent said common passageway are closely spaced from each other while elements remotely spaced from the passageway are spaced at a greater distance from each other.

13. The control system according to claim 9 further comprising control means to adjustably maintain said member defining a geometrical outline in a horizontal disposition relative to a center of gravity of the outline.

14. The control system according to claim 9 wherein said rear receiver includes a matrix of columns and rows of detector surfaces responsive to said laser beam.

15. The control system according to claim 9 wherein said rear receiver includes an array of photosensitive detectors disposed about the periphery of a rectangular shape having its long sides disposed horizontally.

16. The control system according to claim 15 wherein the interior of said rectangular shape of the array of detectors is void of such detectors, said control system further including means to mask the laser beam to define a cruciform in cross section when the laser beam impinges upon said rear receiver.

17. The control system according to claim 16 wherein said laser transmitter includes said means to mask the laser beam which means is further defined to include a diaphragm having a cruciform aperture therein disposed in the path of the laser beam.

18. The control system according to claim 16 wherein said receiver includes said means to mask the laser beam which means is further defined to include a diaphragm having a cruciform aperture therein for passage of the laser beam.

19. The control system according to claim 18 wherein said receiver further includes a lens for enlarging the laser beam passed through said common passageway in said front receiver.

20. The control system according to claim 14 wherein said receiver further includes position control means to maintain the detectors of said rear receiver in a horizontally-stable disposition relative to a center of gravity.

21. The control system according to claim 18 wherein said receiver further includes position control means to maintain the cruciform aperture in said diaphragm in a horizontally-stable disposition relative to a center of gravity.

22. The control system according to claim 9 wherein said rear detector includes an array of detectors, said control system further including means receiving the output signals from the array of detectors of said rear receiver when irradiated by said laser beam to form an error signal to compensate for an arc error of said support arm of the tunneling machine and to compensate for a displacement error of said front receiver.

23. The control system according to claim 19 wherein the detectors of said rear receiver are disposed to form a matrix of columns and rows thereof and disposed at positions to compensate for optical errors of said lens.

24. The control system according to claim 9 further comprising counter means receiving pulse output signals from said transmitter means to form an error signal to compensate for an arc error to the position of said support arm for the winning tool.

25. The control system according to claim 9 further comprising means to displace said member defining a geometrical outline to compensate for an arc error to the position of said support arm for the winning tool.

26. The control system according to claim 9 wherein said servomotor means are adapted to horizontally and vertically displace said rear receiver in a coordinate system having its origin passing through the center of said rear receiver.

27. The control system according to claim 9 wherein said servomotor means are adapted to adjustably translate the detector of said rear receiver.

28. The control system according to claim 9 wherein said member defining a geometrical outline is adapted for movement within the plane passing through the outline.

29. The control system according to claim 9 further including means to compute the distance of travel by the tunneling machine from a fixed point of reference.

30. The control system according to claim 9 further comprising indicator means responsive to displacements of said receiver by said servomotor means and responsive to an output signal from the detector of said rear receiver to form a visual display of angular and parallel deviations of the tunneling machine.

* * * * *